US009892522B2

(12) United States Patent
Smirnov et al.

(10) Patent No.: US 9,892,522 B2
(45) Date of Patent: Feb. 13, 2018

(54) METHOD, APPARATUS AND COMPUTER PROGRAM PRODUCT FOR IMAGE-DRIVEN COST VOLUME AGGREGATION

(71) Applicant: Nokia Technologies Oy, Espoo (FI)

(72) Inventors: Sergey Smirnov, Tampere (FI); Atanas Gotchev, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 68 days.

(21) Appl. No.: 15/116,819

(22) PCT Filed: Feb. 9, 2015

(86) PCT No.: PCT/FI2015/050079
§ 371 (c)(1),
(2) Date: Aug. 4, 2016

(87) PCT Pub. No.: WO2015/121535
PCT Pub. Date: Aug. 20, 2015

(65) Prior Publication Data
US 2017/0178353 A1 Jun. 22, 2017

(30) Foreign Application Priority Data
Feb. 14, 2014 (GB) .................................. 1402608.2

(51) Int. Cl.
*G06T 7/00* (2017.01)
*G06T 7/593* (2017.01)
*H04N 13/02* (2006.01)
*H04N 13/00* (2006.01)

(52) U.S. Cl.
CPC ......... *G06T 7/593* (2017.01); *H04N 13/0018* (2013.01); *H04N 13/0022* (2013.01); *H04N 13/0037* (2013.01); *H04N 13/0239* (2013.01); *H04N 13/0271* (2013.01);
(Continued)

(58) Field of Classification Search
USPC ........................................................ 382/154
See application file for complete search history.

(56) References Cited

U.S. PATENT DOCUMENTS

2012/0008857 A1    1/2012    Choi

OTHER PUBLICATIONS

Tan et al., "Cross Image Inference Scheme for Stereo Matching", Computer Vision—ACCV, 2013, pp. 217-230.
(Continued)

*Primary Examiner* — Jerome Grant, II
(74) *Attorney, Agent, or Firm* — Nokia Technologies Oy

(57) ABSTRACT

In an example embodiment, a method, apparatus and computer program product are provided. The method includes computing a cost volume associated with a reference image. Down-sampling of the cost volume and the reference image into at least one level is performed to generate at least one down-sampled cost volume and at least one down-sampled reference image, respectively. An up-sampling of the at least one down-sampled cost volume and the at least one down-sampled reference image into the at least one level is performed to generate at least one up-sampled cost volume and at least one up-sampled reference image, respectively. A color weight map associated with the cost volume and the at least one down-sampled cost volume is computed based on the reference image and the at least one down-sampled reference image at the at least one level. Aggregated cost volume is determined based at least on the color weight map.

21 Claims, 4 Drawing Sheets

(52) U.S. Cl.
CPC ............... *G06T 2207/10024* (2013.01); *G06T 2207/10028* (2013.01); *H04N 2013/0081* (2013.01)

(56) References Cited

OTHER PUBLICATIONS

Yoon et al., "Adaptive Support-Weight Approach for Correspondence Search", IEEE Transactions on Pattern Analysis and Machine Intelligence, vol. 28, No. 4, Apr. 2006, pp. 650-656.
Paris et al., "A Fast Approximation of the Bilateral Filter Using a Signal Processing Approach", In Proceedings of the European Conference on Computer Vision, 2006, 38 pages.
Yang et al., "Real-Time O(1) Bilateral filtering", IEEE Conference on Computer Vision and Pattern Recognition, Jun. 20-25, 2009, pp. 557-564.
He et al., "Guided Image Filtering", European Conference on Computer Vision, 2010, pp. 1-14.
Yang, "A Non-Local Cost Aggregation Method for Stereo Matching", IEEE Conference on Computer Vision and Pattern Recognition (CVPR), Jun. 16-21, 2012, pp. 1402-1409.
Jen et al., "Adaptive Scale Selection for Hierarchical Stereo", Proceedings of the British Machine Vision Conference (BMVC), 2011, pp. 1-10.
Fattal, "Edge-Avoiding Wavelets and Their Applications", ACM Transactions on Graphics, vol. 28, No. 3, Aug. 2009, pp. 22:1-22:10.
Hanika et al., "Edge-Optimized A-Trous Wavelets for Local Contrast Enhancement With Robust Denoising", Computer Graphics Forum, vol. 30, No. 7, Sep. 2011, 8 pages.
Extended European Search Report received for corresponding European Patent Application No. 15749667.0, dated Aug. 1, 2017, 4 pages.

Min et al.,"Depth Video Enhancement Based on Weighted Mode Filtering", IEEE Transactions on Image Processing, vol. 21, No. 3, Mar. 2012, pp. 1176-1190.
Wang et al., "High-Quality Real-Time Stereo Using Adaptive Cost Aggregation and Dynamic Programming", Proceedings of the Third International Symposium on 3D Data Processing, Visualization, and Transmission, Jun. 14-16, 2006, 8 pages.
Smirnov et al., "Fast Hierarchical Cost Volume Aggregation for Stereo-Matching", IEEE Visual Communications and Image Processing Conference, Dec. 7-10, 2014, pp. 498-501.
International Search Report and Written Opinion received for corresponding Patent Cooperation Treaty Application No. PCT/FI2015/050079, dated Jun. 22, 2015, 12 pages.
Min, D. el al.: "Cost aggregation and occlusion handling with WLS in stereo matching", IEEE Trans. on Image Processing, vol. 17, No. 8, Aug. 2008, pp. 1431-1442.
Yang, Q.-Q., el al.: "Hierarchical joint bilateral filtering for depth postprocessing", Int. Conf. on Image and Graphics, Aug. 12-15, 2011, Hefei, China, pp. 129-134.
Sizintsev, M. et al.: "Coarse-to-fine stereo vision with accurate 3D boundaries", Image and Vision Computing, vol. 28, No. 3, Mar. 2010, pp. 353-366.
Scharstein, D. et al.: "A taxonomy and evaluation of dense two-frame stereo correspondence algorithms", Int. Journal of Computer Vision, vol. 47, No. 1, Apr.-Jun. 2002, pp. 7-42.
Smirnov, S. et al: "Fast hierarchical cost volume aggregation for stereomatching", Visual Communications and Image Processing Conference, Dec. 7-10, 2014, Valletta, Malta, pp. 498-501.
Search Report eceived for corresponding GB Application No. 1402608.2, dated Jul. 30, 2014, 3 pages.
Mizukami et al. "Sub-pixel disparity search for binocular stereo vision", 2012 21st International Conference on Pattern Recognition (ICPR 2012).

METHOD, APPARATUS AND COMPUTER PROGRAM PRODUCT FOR IMAGE-DRIVEN COST VOLUME AGGREGATION

RELATED APPLICATION

This application was originally filed as PCT Application No. PCT/FI2015/050079 filed Feb. 9, 2015 which claims priority benefit from GB Patent Application No. 1402608.2 filed Feb. 14, 2014.

TECHNICAL FIELD

Various implementations relate generally to method, apparatus, and computer program product for image-driven cost volume aggregation.

BACKGROUND

Various electronic devices such as cameras, mobile phones, and other devices are used for capturing multiple multimedia content such as two or more images of a scene. Such capture of the images, for example, stereoscopic images may be used for detection of objects and post processing applications. Some post processing applications include disparity and/or depth estimation of the objects in the multimedia content such as images, videos and the like. Although, electronic devices are capable of supporting applications that capture the objects in the stereoscopic images and/or videos; however, such capturing and post processing applications such as cost aggregation for estimating depth involve intensive computations.

SUMMARY OF SOME EMBODIMENTS

Various aspects of example embodiments are set out in the claims.

In a first aspect, there is provide a method comprising: computing a cost volume associated with a reference image; performing down-sampling of the cost volume into at least one level to generate at least one down-sampled cost volume; performing down-sampling of the reference image into the at least one level to generate at least one down-sampled reference image associated with corresponding at least one down-sampled cost volume; performing backward up-sampling of the at least one down-sampled cost volume into the at least one level to generate at least one backward up-sampled cost volume; performing backward up-sampling of the at least one down-sampled reference image associated with the at least one down-sampled cost volume into the at least one level to generate at least one backward up-sampled reference image associated with corresponding backward up-sampled cost volume; computing at least one color weight map associated with at least one of the cost volume and the at least one down-sampled cost volume based on an associated reference image and the at least one backward up-sampled reference image at the at least one level, the associated reference image being one of the reference image and the at least one down-sampled reference image at the at least one level; determining an aggregated cost volume at the at least one level based on a weighted averaging of the at least one backward up-sampled cost volume and an associated cost volume at the at least one level, the associated cost volume being one of the cost volume and the at least one down-sampled cost volume at the at least one level, the weighted averaging being performed based on the at least one color weight map.

In a second aspect, there is provided an apparatus comprising at least one processor; and at least one memory comprising computer program code, the at least one memory and the computer program code configured to, with the at least one processor, cause the apparatus to perform at least: compute a cost volume associated with a reference image; perform down-sampling of the cost volume into at least one level to generate at least one down-sampled cost volume; perform down-sampling of the reference image into the at least one level to generate at least one down-sampled reference image associated with corresponding at least one down-sampled cost volume; perform backward up-sampling of the at least one down-sampled cost volume into the at least one level to generate at least one backward up-sampled cost volume; perform backward up-sampling of the at least one down-sampled reference image associated with the at least one down-sampled cost volume into the at least one level to generate at least one backward up-sampled reference image associated with corresponding backward up-sampled cost volume; compute at least one color weight map associated with at least one of the cost volume and the at least one down-sampled cost volume based on an associated reference image and the at least one backward up-sampled reference image at the at least one level, the associated reference image being one of the reference image and the at least one down-sampled reference image at the at least one level; determine an aggregated cost volume at the at least one level based on a weighted averaging of the at least one backward up-sampled cost volume and an associated cost volume at the at least one level, the associated cost volume being one of the cost volume and the at least one down-sampled cost volume at the at least one level, the weighted averaging being performed based on the at least one color weight map.

In a third aspect, there is provided a computer program product comprising at least one computer-readable storage medium, the computer-readable storage medium comprising a set of instructions, which, when executed by one or more processors, cause an apparatus to perform at least: compute a cost volume associated with a reference image; perform down-sampling of the cost volume into at least one level to generate at least one down-sampled cost volume; perform down-sampling of the reference image into the at least one level to generate at least one down-sampled reference image associated with corresponding at least one down-sampled cost volume; perform backward up-sampling of the at least one down-sampled cost volume into the at least one level to generate at least one backward up-sampled cost volume; perform backward up-sampling of the at least one down-sampled reference image associated with the at least one down-sampled cost volume into the at least one level to generate at least one backward up-sampled reference image associated with corresponding backward up-sampled cost volume; compute at least one color weight map associated with at least one of the cost volume and the at least one down-sampled cost volume based on an associated reference image and the at least one backward up-sampled reference image at the at least one level, the associated reference image being one of the reference image and the at least one down-sampled reference image at the at least one level; determine an aggregated cost volume at the at least one level based on a weighted averaging of the at least one backward up-sampled cost volume and an associated cost volume at the at least one level, the associated cost volume being one of the cost volume and the at least one down-sampled cost volume at the at least one level, the weighted averaging being performed based on the at least one color weight map.

In a fourth aspect, there is provided an apparatus comprising: means for performing down-sampling of the cost volume into at least one level to generate at least one down-sampled cost volume; means for performing down-sampling of the reference image into the at least one level to generate at least one down-sampled reference image associated with corresponding at least one down-sampled cost volume; means for performing backward up-sampling of the at least one down-sampled cost volume into the at least one level to generate at least one backward up-sampled cost volume; means for performing backward up-sampling of the at least one down-sampled reference image associated with the at least one down-sampled cost volume into the at least one level to generate at least one backward up-sampled reference image associated with corresponding backward up-sampled cost volume; means for computing at least one color weight map associated with at least one of the cost volume and the at least one down-sampled cost volume based on an associated reference image and the at least one backward up-sampled reference image at the at least one level, the associated reference image being one of the reference image and the at least one down-sampled reference image at the at least one level; means for determining an aggregated cost volume at the at least one level based on a weighted averaging of the at least one backward up-sampled cost volume and an associated cost volume at the at least one level, the associated cost volume being one of the cost volume and the at least one down-sampled cost volume at the at least one level, the weighted averaging being performed based on the at least one color weight map.

In a fifth aspect, there is provided a computer program comprising program instructions which when executed by an apparatus, cause the apparatus to: compute a cost volume associated with a reference image; perform down-sampling of the cost volume into at least one level to generate at least one down-sampled cost volume; perform down-sampling of the reference image into the at least one level to generate at least one down-sampled reference image associated with corresponding at least one down-sampled cost volume; perform backward up-sampling of the at least one down-sampled cost volume into the at least one level to generate at least one backward up-sampled cost volume; perform backward up-sampling of the at least one down-sampled reference image associated with the at least one down-sampled cost volume into the at least one level to generate at least one backward up-sampled reference image associated with corresponding backward up-sampled cost volume; compute at least one color weight map associated with at least one of the cost volume and the at least one down-sampled cost volume based on an associated reference image and the at least one backward up-sampled reference image at the at least one level, the associated reference image being one of the reference image and the at least one down-sampled reference image at the at least one level; determine an aggregated cost volume at the at least one level based on a weighted averaging of the at least one backward up-sampled cost volume and an associated cost volume at the at least one level, the associated cost volume being one of the cost volume and the at least one down-sampled cost volume at the at least one level, the weighted averaging being performed based on the at least one color weight map.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 7 of the drawings.

Figure 1:
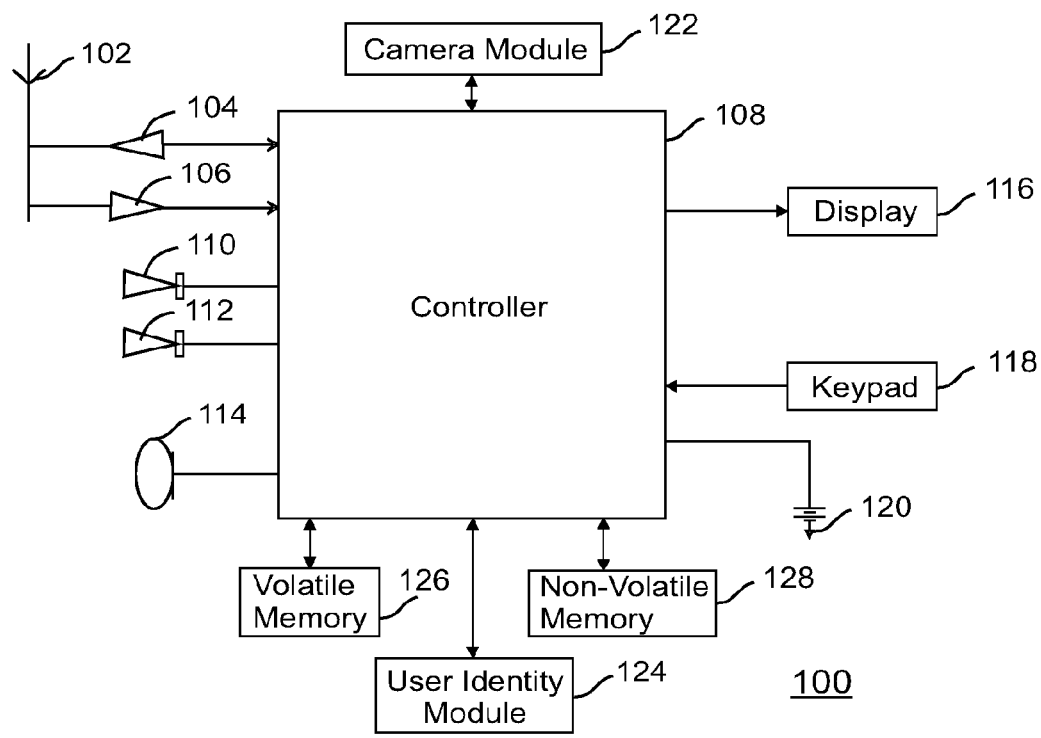
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media-capturing element, such as a camera, video and/or audio module, in communication with the controller 108. The media-capturing element may be any means for capturing an image, video and/or audio for storage, display or transmission. In an example embodiment in which the media-capturing element is a camera module 122, the camera module 122 may include a digital camera (or array of multiple cameras) capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100. Practically, the camera module(s) can also be on anyside, but normally on the opposite side of the display 116 or on the same side of the display 116 (for example, video call cameras).

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
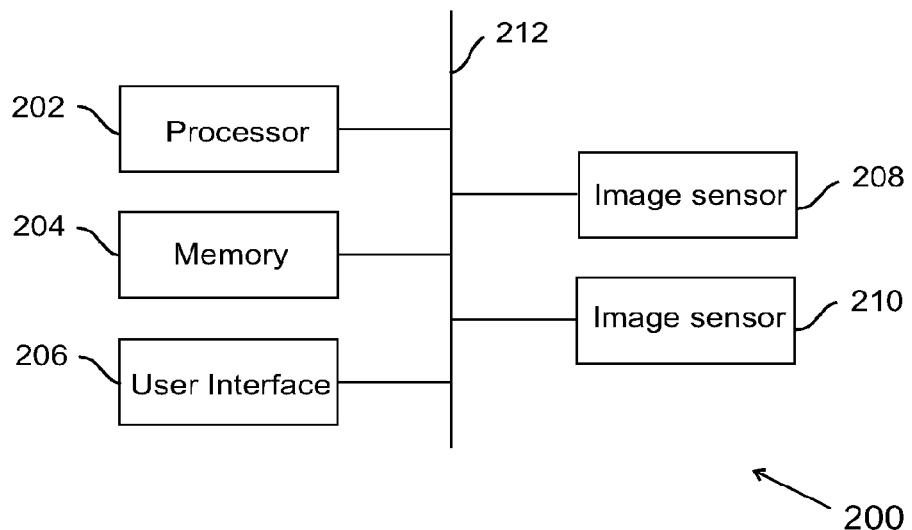
FIG. 2 illustrates an example block diagram of an apparatus, in accordance with an example embodiment.

FIG. 2 illustrates an apparatus 200 for image-driven cost volume aggregation in multimedia content associated with a scene, in accordance with an example embodiment. In an example embodiment, the apparatus 200 may be employed for performing depth estimation using stereo-matching. In an embodiment, the apparatus 200 may be employed in a stereo camera for 3D image capture. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100) or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface (UI) 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the electronic device may include a mobile phone, a personal digital assistant (PDA), and the like. Some examples of computing device may include a laptop, a personal computer, and the like. Some examples of electronic device may include a camera. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus 200 or circuitry to perform the functions of the transceiver. The transceiver may be configured to receive media content. Examples of media content may include images, audio content, video content, data, and a combination thereof.

In an example embodiment, the electronic device may be embodied as to include at least one image sensor, such as an image sensor 208 and image sensor 210. Though only two image sensors 208 and 210 are shown in the example representation of FIG. 2, but the electronic device may include more than two image sensors or only one image sensor. The image sensors 208 and 210 may be in communication with the processor 202 and/or other components of the apparatus 200. The image sensors 208 and 210 may be in communication with other imaging circuitries and/or software, and are configured to capture digital images or to capture video or other graphic media. The image sensors 208 and 210 and other circuitries, in combination, may be example of at least one camera module such as the camera module 122 of the device 100. The image sensors 208 and 210, along with other components may also be configured to capture a plurality of multimedia content, for example images, videos, and the like depicting a scene from different positions (or different angles). In an example embodiment, the image sensors 208 and 210 may be accompanied with corresponding lenses to capture two views of the scene, such as stereoscopic views. In an alternate embodiment, there may be a single camera module having an image sensor used to capture an image of the scene from a position (x), and then move through a distance to another position (y) and capture another image of the scene.

These components (202-210) may communicate to each other via a centralized circuit system 212 to perform image-driven cost volume aggregation in multiple multimedia. The centralized circuit system 212 may be various devices configured to, among other things, provide or enable communication between the components (202-210) of the apparatus 200. In certain embodiments, the centralized circuit system 212 may be a central printed circuit board (PCB) such as a motherboard, main board, system board, or logic board. The centralized circuit system 212 may also, or alternatively, include other printed circuit assemblies (PCAs) or communication channel media.

In an example embodiment, the processor 202 is configured to, with the content of the memory 204, and optionally with other components described herein, to cause the apparatus 200 to facilitate access of a first image and a second image. In an embodiment, the first image and the second image may include slightly different views of a scene having one or more objects. In an embodiment, the first image may be a reference image for which a depth map may be determined. In an embodiment, the second image may be a target image that may represent another viewpoint or another time moment with respect to the first image. In an embodiment, the first image and the second image may be left view image and a right view image, respectively of the same scene. In an example embodiment, the first image and the second image may be frames associated with a video. In an example embodiment, the first image and the second image of the scene may be captured such that there exists a disparity in at least one object point of the scene between the first image and the second image. In an example embodiment, the first image and the second image may form a stereoscopic pair of images. For example, a stereo camera may capture the first image and the second image, such that, the first image includes a slight parallax with the second image representing the same scene. In some other example embodiments, the first image and the second image may also be received from a camera capable of capturing multiple views of the scene, for example, a multi-baseline camera, an array camera, a plenoptic camera and a light field camera. In some example embodiments, the first image and the second image may be prerecorded or stored in an apparatus, for example the apparatus 200, or may be received from sources external to the apparatus 200. In such example embodiments, the apparatus 200 is caused to receive the first image and the second image from external storage medium such as DVD, Compact Disk (CD), flash drive, memory card, or from external storage locations through Internet, Bluetooth®, and the like. In an example embodiment, a processing means may be configured to facilitate access of the first image and the second image of the scene comprising one or more objects, where there exists a disparity in at least one object of the scene between the first image and the second image. An example of the processing means may include the processor 202, which may be an example of the controller 108, and/or the image sensors 208 and 210.

In an embodiment, the first image and the second image may include various portions being located at different depths with respect to a reference location. In an embodiment, the 'depth' of a portion in an image may refer to a distance of the object points (for example, pixels) constituting the portion from a reference location, such as a camera location. In an embodiment, the first image and the second image may include depth information for various object points associated with the respective images. Herein, the terms 'depth' and disparity' may be used interchangeably in various embodiments. In an embodiment, the disparity is inversely proportional to the depth of the scene. The disparity may be related to the depth as per the following equation:

$$D \propto \frac{fb}{d}$$

where, D describes the depth, b represents baseline between two cameras capturing the pair of stereoscopic image, for example, the first image and the second image, f is the focal length for each camera, and d is the disparity value for two corresponding object points.

In an example embodiment, the first image and the second image accessed by the apparatus 200 may be rectified stereoscopic pair of images with respect to each other. In some example embodiments, instead of accessing the rectified stereoscopic pair of images, the apparatus 200 may be caused to access at least one stereoscopic pair of images that may not be rectified. In an embodiment, the apparatus 200 may be caused to rectify the at least one stereoscopic pair of images to generate rectified images such as the first image and the second image. In such example embodiments, the processor 202 is configured to, with the content of the memory 204, and optionally with other components described herein, to cause the apparatus 200 to rectify one of the stereoscopic pair of images with respect to the other image such that a row (for example, a horizontal line) in the image may correspond to a row (for example, a horizontal line) in the other image. In an example embodiment, an orientation of one of the at least one stereoscopic pair of images may be changed relative to the other image such that, a horizontal line passing through a point in one of the image may correspond to an epipolar line associated with the point in the other image. In an example embodiment, due to epipolar constraints in the stereoscopic pair of images, every object point in one image has a corresponding epipolar line in the other image. For example, due to the epipolar constraints, for an object point of the first image, a corresponding object point may be present at an epipolar line in the second image. In an example embodiment, a processing means may be configured to rectify the at least one stereoscopic pair of images such that a horizontal line in the one of the image may correspond to a horizontal line in the other image of the at least one pair of stereoscopic images. An example of the processing means may include the processor 202, which may be an example of the controller 108.

In an embodiment, the processor 202 is configured to, with the content of the memory 204, and optionally with other components described herein, to cause the apparatus 200 to facilitate stereo correspondence between the first image and the second image of the scene by estimating a three dimensional (3D) model of the scene through determination of matching cost associated with matching of pixels between the first image and the second image, and converting two-dimensional (2D) positions of the matching pixels into 3D depths. In an embodiment, the 3D model may refer to cost volume between the first image and the second image. In an embodiment, stereo-correspondence includes the steps of matching cost computation, cost aggregation, disparity computation and disparity optimization.

In an embodiment, the stereo-correspondence may be performed via optimization of the cost volume computed from a pair of images, such as the first image and the second image. In an embodiment, the first image and the second image may be utilized for constructing a 3D cost volume which may include the matching costs for selecting a disparity at image co-ordinates (x, y). For stereo correspondence, the matching cost may be determined by performing pixel-wise correlation between corresponding pixels of the stereo pair of images (e.g., the first image and the second image). In an embodiment, the cost volume may include a plurality of disparity values and a pixel value difference corresponding to the disparity values.

In an embodiment, the cost volume for a rectified stereo pair of images, such as the first image and the second image may include a plurality of slices/layers that may be computed based on a measure of dis-similarity between the corresponding pixels of the first image and the second image for different shifts of the second image. For example, the first image may be a reference image and the second image may be a target image, then the cost volume between the reference image and the target image may be computed by shifting the target image in a direction and in response determining a plurality of shifted versions of target image. In the foregoing description, the plurality of shifted versions of the target image may be referred to as 'plurality of shifted images' for the brevity of description. In an example embodiment, the cost volume for the first image, for example, the left view image may be computed from the following expression:

$$C_L(x,y,d) = \|(L(x,y) - R(x-d,y)\|,$$

Herein, x and y are spatial co-ordinates of the pixel, and the third dimension d corresponds to disparity between left (L) and right (R) images, and $C_L(x,y,d)$ refers to the cost volume associated with a pixel at coordinates (x,y).

Herein, in an embodiment, the cost aggregation associated with depth estimation is described to be performed by computing the cost volume for the left image as an example, however similar description is applicable to cost volume computation for the right image.

In an embodiment, the processor 202 is configured to, with the content of the memory 204, and optionally with other components described herein, to cause the apparatus 200 to compute the cost volume based on a cost computation method. Examples of cost computation methods may include but are not limited to sum of absolute differences (SAD), sum of squared differences (SSD), and the like. In an example embodiment, a processing means may be configured to perform cost computation between the reference image and the plurality of shifted images, and determine the cost volume. An example of the processing means may include the processor 202, which may be an example of the controller 108.

In an embodiment, the cost volume may be associated with the reference image. In an embodiment, the processor 202 is configured to, with the content of the memory 204, and optionally with other components described herein, to cause the apparatus 200 to perform a down-sampling of the cost volume into at least one level. In an embodiment, the down-sampling of the cost volume into the at least one level includes the down-sampling of the cost volume into a single level. In an embodiment, the down-sampling of the cost volume into the at least level may include recursively down-sampling the cost volume into a plurality of levels. In an embodiment, the down-sampling of the cost volume into the plurality of levels may refer to down-sampling of individual slices of the cost volume at each level of the plurality of levels.

In an embodiment, the recursive down-sampling of the cost volume into the plurality of levels may be performed to generate a hierarchical structure, also known as a Gaussian pyramid such that the plurality of levels of down-sampled cost volumes may correspond to layers of the Gaussian pyramid. In an embodiment, the Gaussian pyramid of the cost volume may include a hierarchical structure having 'N' layers (corresponding to the plurality of levels) of the down-sampled cost volumes. It may be noted that on down-sampling the cost volume, a disparity range associated with the down-sampled cost volume is not decimated, and remains same as the disparity range of the original cost volume. In an example embodiment, a processing means may be configured to perform at least one down-sampling of the cost volume to generate the at least one down-sampled cost volume. An example of the processing means may include the processor 202, which may be an example of the controller 108.

In an embodiment, the Gaussian pyramid generated based on the down-sampling of the cost volume may include a plurality of layers corresponding to the plurality of levels of down-sampling, such as $C^1$, $C^2$, $C^3$, $C^4$, $C^N$ such that, $$C^1 = C, C^2 = \text{down-sample}(C^1), \ldots, C^N = \text{down-sample}(C^{N-1})$$

In an embodiment, the down-sampled cost volume computed at each level (or each layer) of the Gaussian pyramid may be optionally filtered by a spatial filter, such as cross-bilateral filter, a cross-non-local-means filter (where weights are calculated based on the corresponding down-sampled reference image) or similar type of spatial filter. An example illustrating down-sampling of the cost volume between the layers of the Gaussian pyramid is illustrated and explained further with reference to FIG. 4.

In an embodiment, the processor 202 is configured to, with the content of the memory 204, and optionally with other components described herein, to cause the apparatus 200 to perform backward up-sampling of the at least one down-sampled cost volume. For example, beginning from a level i=N−1, the down-sampled cost volumes may be up-sampled one step back to a finer level. For example, $$\tilde{C}^i = \text{backward up-sample}(C^{i+1})$$

where, $\tilde{C}^i$ represents backward up-sampled cost volume being generated from a coarser level of the down-sampled cost volume at level (i+1).

In an embodiment, the backward up-sampling of the at least one down-sampled cost volume may include recursively up-sampling of the down-sampled cost volumes. In an embodiment, the backward up-sampling of the sampled cost volumes into the plurality of levels may include backward up-sampling of individual slices of the down-sampled cost volumes. In an example embodiment, a processing means may be configured to perform backward up-sampling of the at least one down-sampled cost volume. An example of the processing means may include the processor 202, which may be an example of the controller 108. The down-sampling and subsequent backward up-sampling of the cost volume into the plurality of levels are explained further in detail with reference to FIG. 4.

In an example embodiment, the backward up-sampling of the cost volume may be performed in a color-weighed manner, using pixels associated with the at least one down-sampled cost volume. For example, the backward up-sampling of the at least one down-sampled cost volume may be performed based on color parameter values of neighboring pixels associated with an individual pixel in the at least one down-sampled cost volume. In an embodiment, performing the backward up-sampling in the color-weighted manner may facilitate in efficient up-sampling of pixels that may be close to strong boundaries and may have limited support because of penalized weighting on the finer levels, for example during down-sampling. The backward up-sampling of the down-sampled cost volume in a color weighted manner is described further in detail with reference to FIG. 5.

In an embodiment, the cost volume may be associated with the reference image. In an embodiment, the reference image may include the color information associated with the cost volume. In an embodiment, the color information may include intensity (gray-scale) or color of the reference image. In an embodiment, the processor 202 is configured to, with the content of the memory 204, and optionally with other components described herein, to cause the apparatus 200 to determine the color information from the reference image associated with the cost volume.

In an embodiment, the at least one down-sampled cost volume may be enhanced with a corresponding color information included in a corresponding reference image. In an embodiment, the processor 202 is configured to, with the content of the memory 204, and optionally with other components described herein, to cause the apparatus 200 to determine the corresponding reference image for the at least one down-sampled cost volume. In an embodiment, the corresponding reference image for the at least one down-sampled cost volume may be determined by recursively down-sampling the reference image associated with the cost volume. In an embodiment, the processor 202 is configured to, with the content of the memory 204, and optionally with other components described herein, to cause the apparatus 200 to recursively down-sample the reference image associated with the cost volume, and generate a plurality of down-sampled reference images corresponding to the plurality of levels. In an embodiment, the down-sampling of the reference image may be performed to generate a Gaussian pyramid. In an embodiment, the Gaussian pyramid of the reference image may include multiple layers, such as $I^1$, $I^2$, $I^3$, $I^4$, $I^N$, and so on, such that:

$$I^1 = I, I^2 = \text{down-sample}(I^1), \ldots, I^N = \text{down-sample}(I^{N-1})$$

In an embodiment, the processor 202 is configured to, with the content of the memory 204, and optionally with other components described herein, to cause the apparatus 200 to perform recursively, backward up-sampling of the at least one down-sampled reference image. In an example embodiment, the backward up-sampling of the at least one down-sampled reference image may include up-sampling of the plurality of down-sampled reference images. For example, beginning from a level i=N−1, the down-sampled reference image may be up-sampled one step back to a finer level. For example, $$\tilde{I}^i = \text{up-sample}(I^{i+1}),$$

where, $\tilde{I}^i$ is an up-sampled reference image being generated from the down-sampled reference image at level (i+1).

In an example embodiment, a processing means may be configured to perform backward up-sampling of the at least one down-sampled reference image. An example of the processing means may include the processor 202, which may be an example of the controller 108. In an embodiment, the processor 202 is configured to, with the content of the memory 204, and optionally with other components described herein, to cause the apparatus 200 to compute at least one color weight map associated with at least one of the cost volume and the at least one of the down-sampled cost volume based on an associated reference image and the at least one backward up-sampled reference image at the at least one level. In an embodiment, the color weight map associated with the cost volume may include computing a difference between the reference image and a backward up-sampled reference image associated with the reference image. In an embodiment, the color weight map associated with the at least one down-sampled cost volume may be computed based on a difference between the down-sampled reference image and the backward up-sampled reference image at the at least one level. In an example embodiment, the difference between the down-sampled reference image and the backward up-sampled reference image at the at least one level may be determined by computing a residual image from a Laplacian pyramid. In an embodiment, the Laplacian pyramid may be constructed corresponding to the Gaussian pyramid of the down-sampled cost volumes, and may be configured to provide the residual (or difference) image computed based on a difference of a down-sampled reference image and a backward up-sampled (or reconstructed) image at a level, for example, ith level. In an example embodiment, the residual image may be computed based on the following expression:

$$\Delta^i(x,y) = I^i(x,y) - \tilde{I}^i(x,y),$$

where, $I^i(x,y)$ represents the reference image associated with at least one down-sampled cost volume, and
$\tilde{I}^i(x,y)$ represents the reference image associated with the at least one backward up-sampled cost volume.

In an example embodiment, the color weight of a pixel (x,y) at a level i may be given by the following expression:

$$W^i(x, y) = e^{-\frac{\|\Delta^i(x,y)\|}{\sigma}}$$

where, $W^i(x,y)$ is a color weight constructed as in a bilateral filter,
$\Delta^i$ represents the residual image; and
$\sigma$ represents an adjusting factor of the bilateral filter.

In an embodiment, for a texture-less portion in the image, for example, the first image, wherein the backward up-sampled reference image $\tilde{I}^i$ corresponds to the down-sampled reference image $I^i$, the residual image may include small (nearly zero) values, and accordingly, the color weight map may be nearly equal to 1. In another embodiment, at high detailed zones, the down-sampling may result in serious smoothing and hence image details may be significant, and accordingly the color weight map may be nearly equal to 0. In an embodiment, based on the values of color weight map for respective levels of the down-sampled cost volumes, an aggregated cost volume for the corresponding level may be determined based on the computed color weight map.

In an example embodiment, the processor 202 is configured to, with the content of the memory 204, and optionally with other components described herein, to cause the apparatus 200 to determine an aggregated cost volume at the at least one level based on a weighted averaging of the backward up-sampled cost volume at the at least one level and an associated cost volume. In an embodiment, the associated cost volume may include one of the cost volume and the at least one down-sampled cost volume at the at least one level. In an example embodiment, for the backward up-sampled cost volume at a first level, the associated cost volume may be the original cost volume that is associated with the reference image. In an example embodiment, for the subsequent levels that may be associated with the down-sampled cost volumes, the associated cost volume may be down-sampled cost volumes at the respective levels. In an embodiment, the weighted averaging is performed based on the color weight map. In an example embodiment, the cost volume of the current layer may be computed based on the following expression:

$$\hat{C}^i(x,y,d) = W^i(x,y) \cdot \tilde{C}^i(x,y,d) + (1 - W^i(x,y)) \cdot C^i(x,y,d)$$

where, $\hat{C}^i(x,y,d)$ represents aggregated cost volume for the at least one level of the plurality of levels.

In an embodiment, additionally or optionally, the aggregated cost volume computed at each level $\hat{C}^i(x,y,d)$ may be again filtered with a spatial filter. Examples of the spatial filter may include, cross bilateral filter, cross non local means, and the like. In an embodiment, the cost volume aggregation described herein facilitates in performing local cost volume aggregation on each level of the plurality of levels, and accordingly based on the color weight map associated with the respective level, it may be determined whether or not to perform cost volume aggregation for the respective level.

In an example embodiment, the cost volume aggregation may be performed at the at least one level while performing a fine-to-coarse sampling. For example, on down-sampling of the cost volume at a level, the processor 202 is configured to, with the content of the memory 204, and optionally with other components described herein, to cause the apparatus 200 to determine whether to perform cost volume aggregation at that level. In another embodiment, the cost volume aggregation may be performed at the at least one level while performing a coarse-to-fine sampling, for example while performing backward up-sampling of the down-sampled cost volumes. For example, while performing up-sampling of a sampled cost volume, at each level of the plurality of levels it may be determined whether or not to perform cost volume aggregation at that level. In yet another example embodiment, the cost volume aggregation may be performed while performing coarse-to-fine sampling as well as while performing fine-to-coarse sampling.

Figure 3:
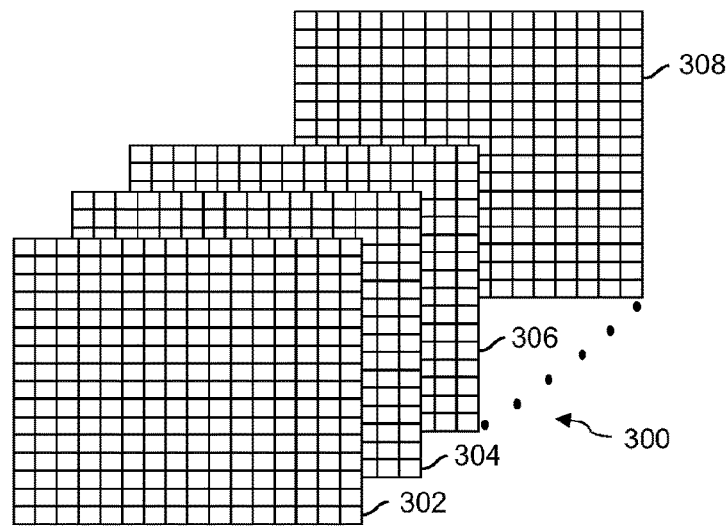
FIG. 3 illustrates an example representation of a cost volume associated with a reference image, in accordance with an example embodiment.

In an example embodiment, the processor 202 is configured to, with the content of the memory 204, and optionally with other components described herein, to cause the apparatus 200 to recursively update weight between the levels/layers of the Gaussian pyramid and update a cost volume of a respective level based on the computed weight associated with the respective level, until a finest layer of the updated Gaussian pyramid is reached. Herein, the finest layer of the updated Gaussian pyramid may refer to a last level of the up-sampled cost volume. In an embodiment, the up-sampling of a down-sampled cost volume associated with a subsequent level is performed from the previously updated cost volume. The subsequent level may refer to a level subsequent to a current level. For example, $\tilde{C}^i$=up-sample $(\hat{C}^{i+1})$ FIG. 3 illustrates an example representation of a cost volume 300 computed from a first image and a second image, in accordance with an example embodiment. In an example embodiment, the first image and the second image may be associated with a scene. Herein, the 'scene' refers to an arrangement (natural, manmade, sorted or assorted) of one or more objects of which the images or videos can be captured, or of which the preview can be generated. In this example embodiment, the first image and the second image are stereoscopic pair of images of the scene captured by a device (for example, a camera module including image sensor 208 and/or 210). In an embodiment, rectifying the first image and the second image includes aligning the first image and the second image such that the horizontal lines (for example, pixel rows) of the aligned first image correspond to horizontal lines (for example, pixel rows) of the aligned second image. It should be noted that the process of rectification for the pair of images (given the camera parameters, either through direct or weak calibration) transforms planes of the original pair of stereoscopic images to different planes in the pair of rectified images such that resulting epipolar lines are parallel and equal along new scan lines.

In an example embodiment, the first image may be a reference image and the second image may be a target image. In an example embodiment, each of the reference image and the target image may include a plurality of pixels. In an embodiment, one of the images, for example the second image may be shifted in a direction and a matching cost between the pixels of the first image and the shifted second image may be computed at a particular value of shift. In an embodiment, a fixed image such as the first image may be referred to as a reference image while the shifting image such as the second image may be referred to as a target image. In an embodiment, the shifting of the target image in a direction may lead to generation of a plurality of shifted images. In an embodiment, the matching of the corresponding pixels between the reference image and the plurality of shifted images may facilitate in generation of a 3-D volume, known as a cost volume, for example the cost volume 300.

In an embodiment, the matching costs for the reference image and the plurality of target images may be computed based on methods such as sum of squared differences (SSD), sum of absolute differences (SAD), and the like. In an embodiment, the methods such as SSD and SAD includes computing a squared difference or absolute differences of the reference image and the target image pixel-wise. In an embodiment, for each target image of the plurality of target images, there may be a SAD/SSD map that may be equal to the size of the first image and/or second image, and thus leads to the formation of the cost volume. As illustrated in FIG. 3, the cost volume 300 is shown to include a plurality of SAD/SSD maps (hereinafter, referred to as slices of the cost volume). The slices of the cost volume are represented by numerals 302, 304, 306, and 308. In an embodiment, the cost volume 300 may be utilized for determination of disparity of each pixel. In an example embodiment, the cost volume 300 may be sampled at least once to facilitate in determination of the depth of the pixels of the first image and/or the second image. The sampling of the cost volume 300 is illustrated and explained in detail with reference to FIG. 4.

Figure 4:
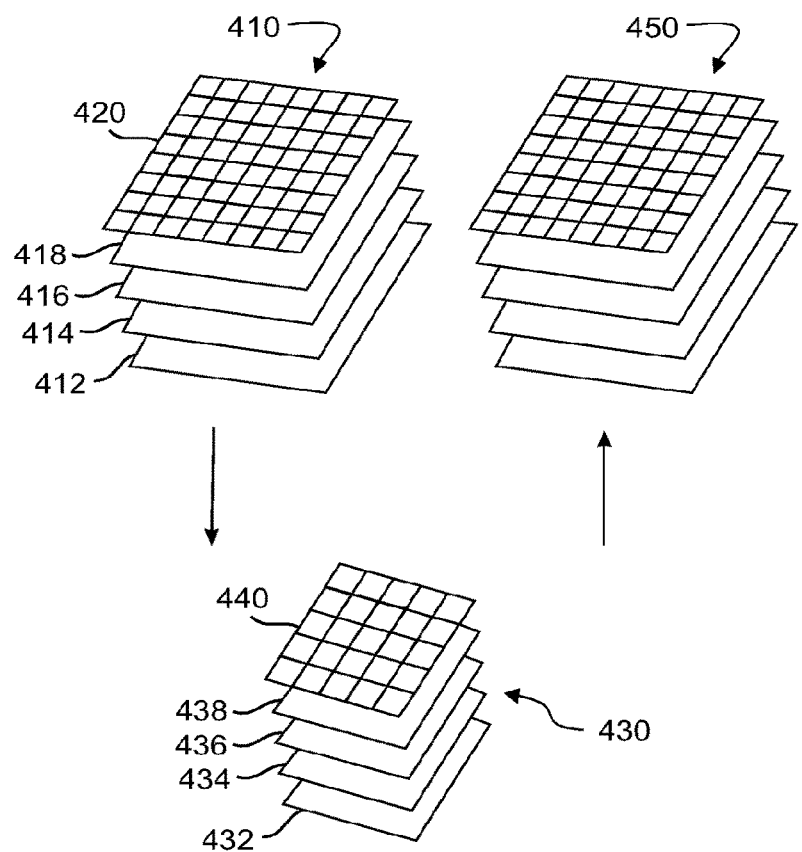
FIG. 4 illustrates an example representation of down-sampling and backward up-sampling of a cost volume, in accordance with an example embodiment.

FIG. 4 illustrates an example representation of down-sampling and backward up-sampling of a cost volume, for example, a cost volume 410, in accordance with an example embodiment. In an embodiment, the cost volume 410 is an example of the cost volume 300 (FIG. 3). In an embodiment, the down-sampling of the cost volume facilitates in performing cost aggregation in a memory efficient manner. In an embodiment, the cost aggregation may include performing down-sampling of the cost volume 410 followed by backward up-sampling of the down-sampled cost volume.

In an embodiment, the sampling of the cost volume 410 may include decimation (or down-sampling) applied to the plurality of slices of the cost volume 410 to generate the at least one level of the sampled cost volume. The down-sampling of the plurality of slices of the cost volume 410 to generate the at least one level of the down-sampled cost volume, for example a cost volume 430, may include down-sampling of the cost volume from a finer level to a coarser level, and may be referred to as a fine-to-coarse sampling. In an embodiment, the backward up-sampling of the plurality of slices of the down-sampled cost volume to the plurality of up-sampled cost volumes may include up-sampling of the cost volume (or the down-sampled cost volume) from the coarser level back to the finer level, and may be referred to as a coarse-to-fine sampling. For example, the plurality of slices of the down-sampled cost volume 430 may be recursively up-sampled to a generate plurality of up-sampled cost volumes, for example an up-sampled cost volume 450. In an embodiment, the down-sampling and the up-sampling may be performed by applying a pre-defined scaling factor f. For example, during the down-sampling the cost volume 410 ($C^i$) may be down-sampled by a factor f to generate the down-sampled cost volume 430 ($C^{i+1}$). During the up-sampling, the down-sampled cost volume 430 ($C^{i+1}$) may be up-sampled by the scaling factor f to generate the up-sampled cost volume 450 ($\tilde{C}^i$).

during down-sampling, $C^{i+1} = C^i \downarrow_f$, and
during up-sampling, $\tilde{C}^i = C^{i+1} \uparrow_f$.

In an embodiment, the up-sampling of the down-sampled cost volume at a level (for example, a level i) facilitates in reconstructing the cost volume at that level (for example, at the level i). In FIG. 4, the sampling of the cost volume is shown for only one level. For example, the cost volume 410 is down-sampled to the cost volume 430, and subsequently, the cost volume 430 is up-sampled to the cost volume 450 to thereby generate a reconstructed cost volume. It will however be noted that the process of the down-sampling of the cost volume and subsequent up-sampling of the down-sampled cost volume may be performed recursively for a plurality of levels. In an embodiment, the decimation (or down-sampling) of the cost volume slices does not affect disparity range, and thus coarser cost volume is fully compatible with up-sampled (or finer) cost volume.

In an embodiment, the cost volume 410 may be down-sampled into a plurality of levels to generate a Gaussian pyramid. The Gaussian pyramid may include a plurality of levels that may be generated based on recursive down-sampling of the levels of the Gaussian pyramid. For example, a cost volume C1 at a level-1 may be down-sampled to generate a down-sampled cost volume at a level-2, the down-sampled cost volume at the level-2 may further be down-sampled to generate a down-sampled cost volume at a level-3, and so on. In another example embodiment, the cost volume 410 may be down-sampled into a single level. For example as illustrated in FIG. 4, the cost volume 410 is down-sampled into a single level to generate a down-sampled cost volume 430.

In an embodiment, the terminology 'down-sampling of the cost volume' and 'backward up-sampling of the sampled cost volume' may refer to down-sampling and up-sampling respectively of a plurality of slices of the cost volume. For example, as illustrated in FIG. 4, the cost volume 410 may include a plurality of slices, for example slices 412, 414, 416, 418, and 420. In an embodiment, upon down-sampling of the cost volume 410 into one level, the slices of the cost volume 410 may be down-sampled to form the respective slices of the down-sampled cost volume 430. For example, the slices 412, 414, 416, 418 and 420 of the cost volume 410 may be down-sampled to form slices 432, 434, 436, 438, and 440 respectively of the sampled cost volume 430. The down-sampled cost volume, for example the cost volume 430 may be up-sampled such that upon up-sampling of the cost volume 430, the slices of the cost volume 430 may be up-sampled to form the respective slices of the up-sampled cost volume 450.

In an embodiment, the slices of the cost volume, for example the cost volume 410 may be down-sampled such that an over-smoothening of the strong depth discontinuities in the estimated disparity map may be avoided. In an embodiment, each level of the cost volume pyramid, for example the Gaussian pyramid, is enriched with a correspondingly down-sampled reference image. The corresponding down-sampled reference image associated with each level of the cost volume pyramid may be utilized to determine a color weight map associated with each level of the Gaussian pyramid that may be utilized to penalize over-smoothing across boundaries, thereby facilitating in color-weighted hierarchical aggregation. For example, based on the color weight map associated with a particular level, it may be determined whether to apply or skip a color-weighted cost aggregation on each level of the Gaussian pyramid. In an embodiment, the cost aggregation may be applied either before subsequent decimation (when creating next coarser level) or after backward coarse-to-fine propagation (when current cost volume has been already fused with the coarser estimate), or even twice. In an embodiment, while interpolating from the coarser level to the finer level, a color-weighted up-sampling of the cost volume may be applied. The color weighted up-sampling of the cost volume is described in detail with reference to FIG. 5.

Figure 5:
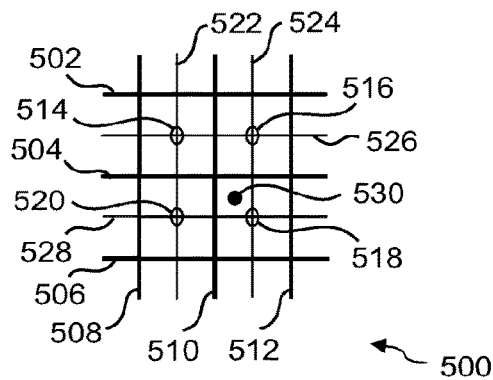
FIG. 5 illustrates an example representation of backward up-sampling, in accordance with an example embodiment.

FIG. 5 illustrates an example representation of backward up-sampling of a slice 500 of a cost volume, in accordance with an example embodiment. In certain example scenarios, during down-sampling of the cost volume, the pixels that are closer to strong boundaries may have limited support because of penalized weighting on finer levels of pyramid. In an embodiment, for overcoming the difficulty involved in the penalized weighting on the finer levels, a color-weighted backward up-sampling may be performed for the pixels associated with the down-sampled cost volume.

In an example, the slice 500 may be an example of a slice of the down-sampled cost volume 430. In an embodiment, while performing backward up-sampling of the down-sampled cost volume, for example the down-sampled cost volume 430, a plurality of slices included in the down-sampled cost volume 430 may be backward up-sampled. In an embodiment, a corresponding pixel in the up-sampled cost volume may be computed based on respective color parameter value of neighboring pixels associated with an individual pixel in the down-sampled cost volume 430.

In an example embodiment, wherein the down-sampled cost volume is generated based on a scale factor (f) of 2 and every four neighboring pixels may average to one coarser pixel, the backward up-sampling may be represented as illustrated in FIG. 5. In FIG. 5, the grid-lines 502, 504, 506, 508, 510 and 512 correspond to a grid of coarse pixels, and hollow dots 514, 516, 518, and 520 correspond to the centers of coarse grid. Also, a high-resolution pixels grid is shown with lines 522, 524, 526, and 528. The four pixels 514, 516, 518, and 520 from coarser grid correspond to one finer pixel 530 that may be estimated from the four pixels 514, 516, 518, and 520.

In an embodiment, the backward sampling may be performed based on the expression:

$$C^i(x,y) = \tilde{W}_0 \cdot C^{i+1}(u_0, v_0) + \tilde{W}_1 \cdot C^{i+1}(u_1, v_1) + \tilde{W}_2 \cdot C^{i+1}(u_2, v_2) + \tilde{W}_3 \cdot C^{i+1}(u_3, v_3)$$

where, $(u_0, v_0)$, $(u_1, v_1)$, $(u_2, v_2)$ and $(u_3, v_3)$ are low resolution grid coordinates, and $\tilde{W}_k(x,y)$ is a corresponding color parameter value between a current fine grid-pixel and neighboring coarse grid pixel $(u_k, v_k)$.

Herein, $$\tilde{W}_k(x, y) = \frac{W_k(x, y)}{\sum_j W_j(x, y)}$$

$W_k(x,y) = c_k \cdot e^{-\|I^i(x,i) - I^{i+1}(u_k, v_k)\|}$, and $c_k$ is a constant factor, and $\|.\|$ denotes some color-distance metric, calculated as, for instance, L1 or L2 norm.

Figure 6:
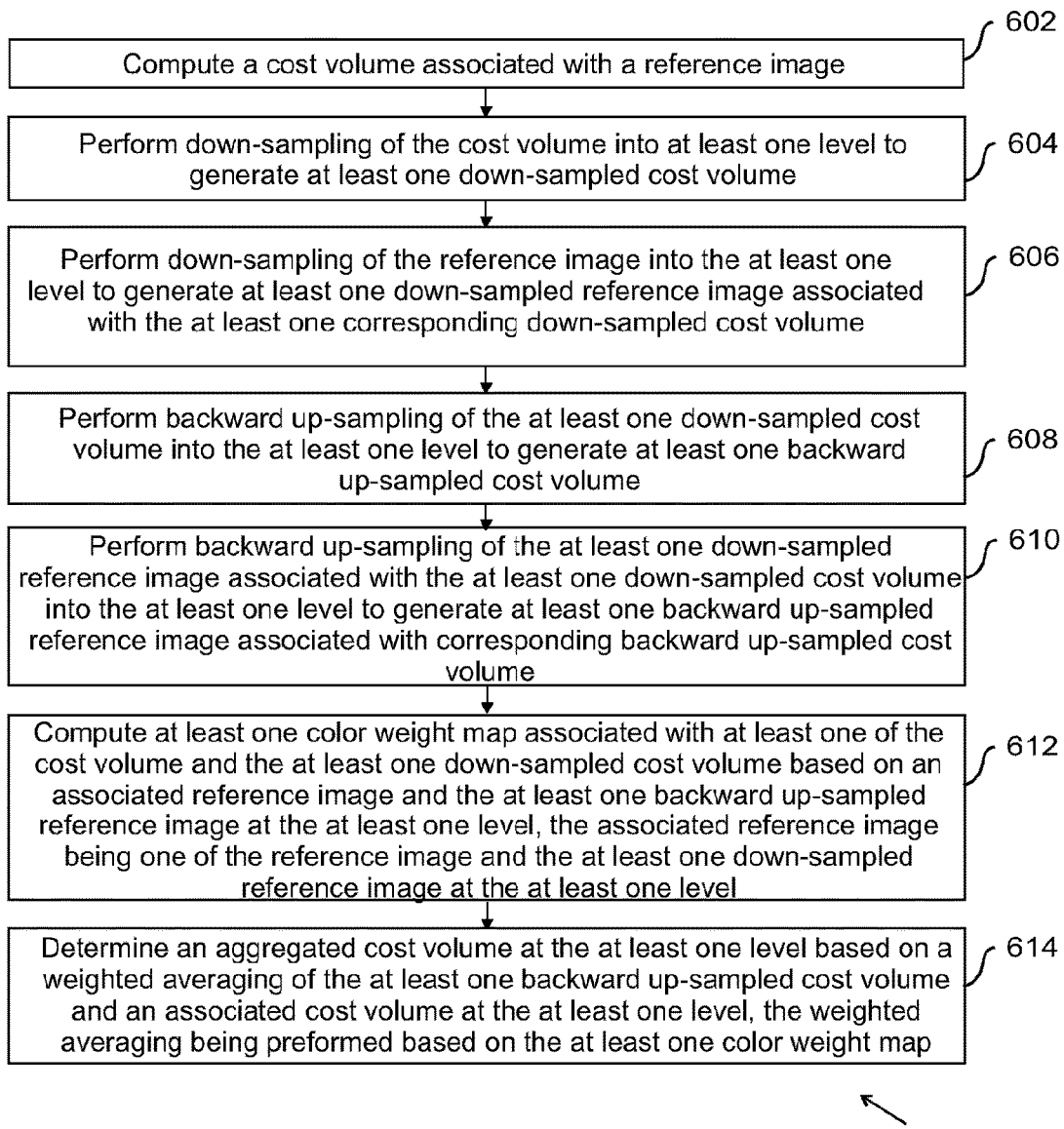
FIG. 6 is a flowchart depicting an example method, in accordance with an example embodiment.

FIG. 6 is a flowchart depicting an example method 600 for image driven cost volume aggregation in images, in accordance with an example embodiment. In an example embodiment, the method 600 includes cost aggregation in images of a scene, where the images of the scene are captured such that there exist a disparity in at least one object of the scene between the images. The method 600 depicted in the flow chart may be executed by, for example, the apparatus 200 of FIG. 2.

In an embodiment, the images such as a first image and a second image of the scene may be accessed. As described in reference to FIG. 2, the first image and the second image may be accessed from a media capturing device including two sensors and related components, or from external sources such as DVD, Compact Disk (CD), flash drive, memory card, or received from external storage locations through Internet, Bluetooth®, and the like. In an example embodiment, the first image and the second image may include two different views of the scene. In an embodiment, the first image and the second image are rectified images. In an embodiment, the first image may be a reference image while the second image may be a target image. In an embodiment, the target image may be shifted in one direction to thereby facilitate in computation of a cost volume.

At block 602, the method 600 includes, computing a cost volume based on a matching of the reference image with a plurality of shifted versions of a target image. The 'plurality of shifted versions of the target image' may hereinafter be referred to as 'a plurality of shifted images'. In an embodiment, the plurality of shifted images associated with the target image may be generated by shifting the target image in one direction. The generation of the cost volume is explained in detail with reference to FIG. 3. In an embodiment, the cost volume is associated with the reference image.

At block 604, the method 600 includes performing a down-sampling of the cost volume into at least one level to generate at least one down-sampled cost volume. In an embodiment, the down-sampling of the cost volume into the at least one level may include down-sampling the cost volume to generate a single sampled cost volume. In another embodiment, down-sampling of the cost volume into the at least one level may include down-sampling the cost volume recursively to generate a plurality of down-sampled cost volumes. For example, a cost volume (C) may be down-sampled recursively so as to generate a plurality of down-sampled cost volumes such as $C^1, C^2, C^3, C^4, C^N$ such that, $$C^1 = C, C^2 = \text{down-sample}(C^1), \ldots, C^N = \text{down-sample}(C^{N-1})$$

At block 606, a down-sampling of the reference image into the at least one level may be performed to generate at least one down-sampled reference image associated with at least one corresponding down-sampled cost volume. For example, a reference image (I) may be down-sampled recursively so as to generate a plurality of down-sampled reference images such as $I^1, I^2, I^3, I^4, I^N$, and so on, such that $$I^1 = I, I^2 = \text{down-sample}(I^1), \ldots, I^N = \text{down-sample}(I^{N-1})$$

At block 608, a backward up-sampling of the at least one down-sampled cost volume into the at least one level may be performed to generate at least one backward up-sampled cost volume. In an embodiment, the backward up-sampling of the at least one down-sampled cost volume may include the backward up-sampling of a down-sampled cost volume at a level, for example ith level. In an embodiment, the backward up-sampling of the at least one down-sampled cost volume may be performed based on respective color parameters of neighboring pixels associated with an individual pixel in the at least one down-sampled cost volume. An example illustrating and describing the backward up-sampling based on the respective color parameters of neighboring pixels is explained with reference to FIG. 5.

At block 610, a backward up-sampling of the at least one down-sampled reference image associated with the at least one down-sampled cost volume into the at least one level may be performed. In an embodiment, the backward up-sampling may generate at least one backward up-sampled reference image associated with corresponding backward up-sampled cost volume.

At block 612, a color weight map associated with the cost volume and the at least one down-sampled cost volume at the at least one level is computed. In an embodiment, the color weight map for the cost volume may be computed based on the reference image and a backward up-sampled reference image at a first level. In an embodiment, the color weight map fir the at least one down-sampled cost volume is computed based on a corresponding down-sampled reference image and a backward up-sampled reference image at the at least one level. For example, a color weight map at a level 3 of a plurality of levels of the Gaussian pyramid may be determined based on a difference of down-sampled reference image at level 3 and up-sampled reference image at level 3. Herein, it will be noted that the down-sampled reference image at level 3 is generated by down-sampling a finer level reference image (at level 2), and the up-sampled reference image at level 3 may be generated by up-sampling the down-sampled reference image at level 4 of the Gaussian pyramid. In an example embodiment, the value of color weight map in textureless portions of the image (for example, the target image) may be nearly 1, while in a high detailed zone, the value of color weight may be nearly equal to 0.

At block 614, an aggregated cost volume at the at least one level is determined based on a weighed averaging of the at least one backward up-sampled cost volume and an associated cost volume at the at least one level. In an embodiment, the associated cost volume may be one of the cost volume and the at least one down-sampled cost volume at the at least one level. For example, for a first level, the associated cost volume may be the (original) cost volume that is associated with the reference image. For levels other than the first level, the associated cost volume may be the at least one down-sampled cost volume at that level. In an embodiment, the weighed averaging may be performed based on the color weight map associated with the at least one level. In an example embodiment, the aggregated cost may be computed based on the following expression:

$$\hat{C}^i(x,y,d) = W^i(x,y) \cdot \tilde{C}^i(x,y,d) + (1 - W^i(x,y)) \cdot C^i(x,y,d)$$

where, $\hat{C}^i(x,y,d)$ represents aggregated cost volume for the at least one level.

Based on the above expression, the low-textured pixels may replace their values by aggregated values while high textured pixels may retain their values while performing backward up-sampling, thereby avoiding cost aggregation.

Figure 7:
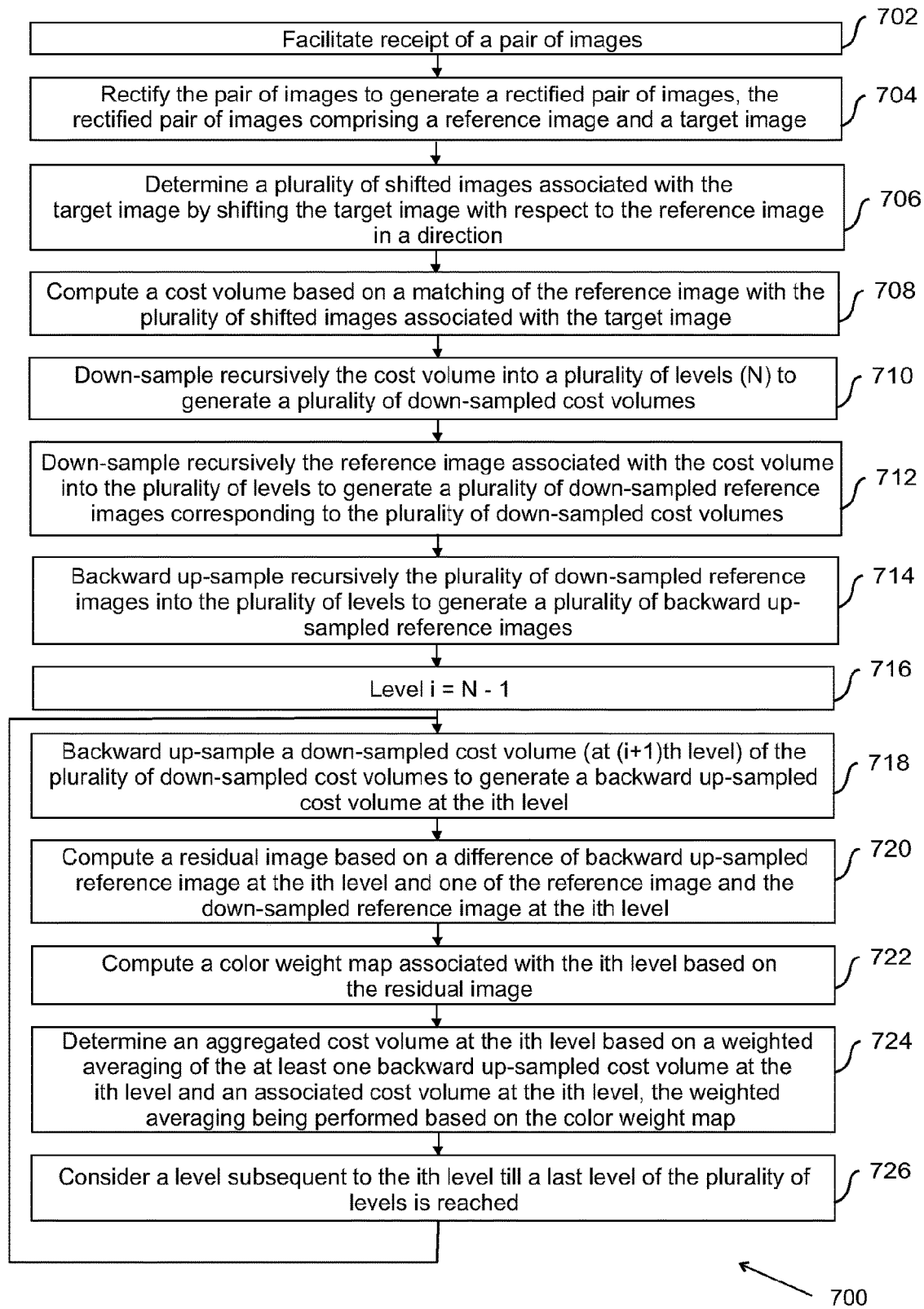
FIG. 7 is a flowchart depicting an example method for image-driven cost volume aggregation, in accordance with another example embodiment.

FIG. 7 is a flowchart depicting an example method 700 for performing image-driven cost volume aggregation, in accordance with another example embodiment. The method 700 depicted in the flow chart may be executed by, for example, the apparatus 200 of FIG. 2. In various embodiments, the method 700 facilitates in performing cost volume aggregation based on cost volumes associated with the images. In various examples, the method 700 includes performing cost volume aggregation in images associated with a scene in a memory-efficient manner. For example, the method 700 facilitates in aligning cost volume associated with a pair of images (including a target image and a reference image) with the reference image, and utilize intensity information and color information from the reference image for aggregation of the cost volume. The example embodiment of method 700 is explained with the help of stereoscopic pair of images, but it should be noted that the various operations described in the method 700 may be performed at any two or more images of a scene captured by a multi-baseline camera, an array camera, a plenoptic camera and a light field camera. For example, the method 700 may be utilized for applications involving cost volume aggregation such as image segmentation, image colorization and de-colorization, alpha-matting and the like.

At block 702, the method 700 includes facilitating receipt of at least one pair of images. In an embodiment, the at least one pair of images may include stereoscopic images. In an embodiment, the at least one pair of images may be captured by a stereo camera. In another embodiment, the at least one pair of images may also be captured by a multi-baseline camera, an array camera, a plenoptic camera or a light-field camera. In certain embodiments, the at least one pair of images may be received at the apparatus 200 or otherwise captured by the sensors. In an embodiment, the at least one pair of images may not be rectified images with respect to each other. In such cases, the method 700 (at block 704) may include rectifying the at least one pair of images such that rows in the at least one pair of images may correspond to each other. In an embodiment, in case the at least one pair of images accessed at the apparatus 200 are rectified images, the operation of rectification (at block 704) is not required.

At block 704, the at least one pair of images may be rectified to generate a rectified pair of images. In an embodiment, the rectified pair of images may include a first image and a second image. In an embodiment, the first image and the second image may be shifted and matched to generate a disparity of each pixel. In an embodiment, the first image and the second image may be a target image and a reference image, respectively that may be utilized for estimation of disparity between the first image and the second image. At block 706, the target image may be shifted in one direction and a map between the reference image and a plurality of shifted versions of target images may be generated. As illustrated and discussed in FIG. 3, for each shift value in the target image, a map (or image) equal to the size of the target image may be generated based on a matching of the reference image with one of the plurality of shifted images associated with the target image. In an embodiment, corresponding to a plurality of shifts of the target image in a direction, a 3D space may be created, also known as a cost volume (at block 708), wherein the maps (or images) corresponding to the multiple shifts may form a plurality of slices of the cost volume. In an embodiment, the plurality of slices of the cost volume corresponds to a plurality of matching costs between pixels of the first image and the second image.

In an embodiment, the cost volume may be associated with the reference image. In an embodiment, the reference image associated with the cost volume may include a color information and intensity information associated with the cost volume.

At block 710, the cost volume may be recursively down-sampled to generate a plurality of down-sampled cost volumes. In an embodiment, the cost volume may be recursively down-sampled to generate a plurality of levels (N) of the cost volume being defined by a plurality of levels of a Gaussian pyramid. For example, the cost volume (C) may be down-sampled to generate a first level of the Gaussian pyramid, the first level may be down-sampled to generate a second level, and so on. The generation of the Gaussian pyramid by recursively down-sampling the Gaussian pyramid may be given as follows:

$$C^1 = C, C^2 = \text{down-sample}(C^1), \ldots, C^N = \text{down-sample}(C^{N-1})$$

Additionally or alternatively, in an embodiment, the cost volume computed at each level of the Gaussian pyramid may be filtered by a filter. An example illustrating down-sampling of the cost volume between the layers of the Gaussian pyramid is illustrated and explained further with reference to FIG. 4.

In an embodiment, the reference image associated with the cost volume may be recursively down-sampled into the plurality of levels to generate a plurality of down-sampled reference images corresponding to the plurality of down-sampled cost volumes at block 712. In an embodiment, the down-sampling of the reference image may be performed to generate a pyramid. In an embodiment, the pyramid of the reference image may include a plurality of levels, such as $I^1$, $I^2$, $I^3$, $I^4$, $I^N$, and so on, such that:

$$I^1 = I, I^2 = \text{down-sample}(I^1), \ldots, I^N = \text{down-sample}(I^{N-1})$$

At block 714, the plurality of down-sampled reference images may be up-sampled backwards recursively to generate a corresponding plurality of backward up-sampled (or reconstructed) reference images. In an example embodiment, the plurality of backward up-sampled reference images may be generated based on the expression:

$$\tilde{I}_i = \text{upsample}(I^{i+1})$$

where, $\tilde{I}_i$ is a backward up-sampled image at a level 'i' being reconstructed based on backward up-sampling of the down-sampled reference image at $(i+1)^{th}$ level.

In an embodiment, a coarse-to-fine up-sampling of the plurality of down-sampled cost volumes may be performed for reconstructing the cost volume. In an embodiment, the coarse-to-fine up-sampling may be performed based on a color weight map associated with each level of the down-sampled cost volume. In an embodiment, a color weight map associated with the plurality of levels of the cost-volumes may be determined based on the color information associated with the respective level of the plurality of cost-volumes. In an example embodiment, the color weight map associated with an 'N'th level of down-sampled cost volume ($C^N$) may be determined based on a difference of color information of the down-sampled reference image at level 'i' and a reconstructed or (backward up-sampled) reference image at the level T. For example, at block 716, a level i=N−1 is considered. Herein, N represents the number of levels associated with the Gaussian pyramid. For example, if the cost volume is recursively down-sampled so as to generate 5 levels of the Gaussian pyramid, then the value of N would be 5, and the level to be considered at block 716 is 4.

At block 718, a down-sampled cost volume associated with the (i+1)th level may be backward up-sampled to generate a backward up-sampled cost volume at the ith level. For example, in a first iteration, if the level under consideration is 4 (for example, where a total number of levels in the Gaussian pyramid is 5), then the up-sampled cost volume associated with the $5^{th}$ level may be backward up-sampled. In an embodiment, backward up-sampling of the down-sampled cost volume at the (i+1)th level may include up-sampling of the down-sampled cost volume at the (i+1)th level. In an embodiment, the backward up-sampling of the down-sampled cost volume may be performed based on respective color parameter value of neighboring pixels associated with an individual pixel in the down-sampled cost volume. The backward up-sampling of the down-sampled cost volume based on the color parameter value of neighboring pixels of the individual pixels is already explained with reference to FIG. 5.

At block 720, a residual image based on a difference between a backward up-sampled reference image at ith level and one of a reference image and a down-sampled reference image at ith level may be computed. For example, for i=1, which is the first level, the residual image may be computed based on a difference of the original reference image and an backward up-sampled reference image at level i=1. Herein, the backward up-sampled reference image at level i=1 may be obtained by up-sampling a down-sampled reference image at level i=2. In another embodiment, for other levels such as levels i=2, 3, and so on, the residual image may be computed based on a difference of the backward up-sampled reference image at the ith level and a down-sampled reference image at the ith level. In an example embodiment, the residual image may be computed based on the following expression:

$$\Delta^i(x,y) = I^i(x,y) - \tilde{I}^i(x,y), \text{ where}$$

$I^i(x,y)$ represents an original reference image (at i=1) in some embodiments, and a down-sampled reference image (at levels other than level i=1) associated with an ith level of the plurality of levels in some other embodiments, $\tilde{I}^i(x,y)$ represents a reconstructed (or backward up-sampled) reference image constructed by up-sampling the down-sampled reference image associated with the ith level of the plurality of levels, and $\Delta^i(x,y)$ represents the residual image at the ith level.

At block 722, a color weight map associated with the ith level of the down-sampled cost volume may be computed based on the residual image. In an example embodiment, the color weight map for ith level may be computed based on the residual image associated with the ith level being generated at block 720. In an embodiment, the color weight map associated with an ith level of the cost volume may be given by the following expression:

$$W^i(x,y) = e^{-\frac{\|\Delta^i(x,y)\|}{\sigma}}$$

In an embodiment, for a texture-less portion in the image, for example, the first image, wherein the reconstructed reference image (or backward up-sampled image) Ĩ corresponds to the original image (or down-sampled image at level i) $I^i$, the residual image may include small (nearly zero) values, and accordingly, the color weight map may be nearly equal to 1. In another embodiment, at high detailed zones, the down-sampling may result in serious smoothing and hence details may be significant, and accordingly the color weight map may be nearly equal to 0. In an embodiment, based on the values of color weight map for respective levels of the down-sampled cost volumes, an aggregated cost volume for the corresponding level may be determined based on the computed color weight map at block 724. In an example embodiment, the aggregated cost volume for the ith level may be determined based on a weighted averaging of the at least one backward up-sampled cost volume at the ith level and an associated cost volume at the ith level. In an example embodiment, the aggregated cost volume for the ith level may be determined following expression:

$$\hat{C}^i(x,y,d) = W^i(x,y) \cdot \tilde{C}^i(x,y,d) + (1-W^i(x,y)) \cdot C^i(x,y,d)$$

At block 726, a level subsequent to the ith level may be considered, and an aggregated cost volume for the subsequent level may be determined by following blocks 718 to 724 until a last level of the plurality of levels is reached. In an embodiment, the method 700 for cost aggregation facilitates in performing local aggregation on each level of the plurality of levels, and accordingly based on the color weight map associated with the respective levels it may be determined whether or not to perform cost aggregation for the respective level.

In an example embodiment, the cost volume aggregation may be performed at the plurality of levels while performing a fine-to-coarse sampling. For example, on down-sampling of a level of the cost volume, the method 700 may be applied to determine whether to perform cost volume aggregation at that level. In another embodiment, the cost volume aggregation may be performed at the plurality of levels while performing a coarse-to-fine sampling, for example while performing backward up-sampling. For example, while performing backward up-sampling of the down-sampled cost volume, at each level of the plurality of levels it may be determined whether or not to perform cost volume aggregation at that level. In an example embodiment, the method 700 for cost volume aggregation may be performed while performing coarse-to-fine sampling as well as while performing fine-to-coarse sampling.

In an example embodiment, the method 700 for depth estimation may applied once or more than once for processing of images. For example, in stereo-matching, two depth maps, associated with left and right cameras correspondingly, may be estimated by applying method 700 twice. Herein, during the first application of method 700, the left image may be assumed to be the reference image and right image may be the target image. In such an example scenario, the depth map associated with the left image may be obtained. Thereafter, the method 700 may be applied again such that the right image may be assumed as the reference image and the left image may be the target image. In this example scenario, the depth map associated with the right image may be determined.

It should be noted that to facilitate discussions of the flowcharts of FIGS. 6 and 7, certain operations are described herein as constituting distinct steps performed in a certain order. Such implementations are examples only and are non-limiting in scope. Certain operation may be grouped together and performed in a single operation, and certain operations can be performed in an order that differs from the order employed in the examples set forth herein. Moreover, certain operations of the methods 600 and 700 are performed in an automated fashion. These operations involve substantially no interaction with the user. Other operations of the methods 600 and 700 may be performed by in a manual fashion or semi-automatic fashion. These operations involve interaction with the user via one or more user interface presentations. It is also to be noted herein that the methods for image-driven cost volume aggregation such as methods 600 and 700 may be applied to multiple applications running in parallel in a device, for example, the device 100 (FIG. 1). For example, the method 600 may be applied simultaneously for performing stereo matching and image segmentation in the device for example, the device 100. In such a scenario, the apparatus such as the apparatus 200 (FIG. 2) embodied in the device 100 may be configured to perform one or more steps of the method(s) 600/700 in parallel to thereby facilitate the processes of image segmentation and stereo-matching simultaneously.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to perform image driven cost volume aggregation in images (for example, in stereoscopic images) of a scene, where there is a disparity between the objects in the images. Various embodiments provide techniques for reducing the computational complexity as well as providing memory-efficient solutions for cost volume aggregation by facilitating the cost volume aggregation based on the color image associated with the cost volume. Various embodiments facilitates in sampling of a cost volume constructed from a reference (or color) image and a target image for performing cost aggregation and subsequent depth estimation in the images. In an embodiment, since the down-sampling and backward up-sampling of the cost volumes occurs in the cost volume domain and not in disparity map domain, a backward up-sampling of a disparity range associated with the disparity map is avoided, and thus the coarser cost volumes are compatible with the finer cost volumes. Additionally, since the coarse-to-fine fusion is not affected by different frequency content in the coarse (down-sampled cost volume) and fine (backward up-sampled cost volume), the coarse-to-fine fusion and up-scale propagation is easy and straight-forward.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer. In one example embodiment, the computer readable medium may be non-transitory.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

We claim:

1. A method comprising:
    computing a cost volume associated with a reference image;
    performing down-sampling of the cost volume into at least one level to generate at least one down-sampled cost volume;
    performing down-sampling of the reference image into the at least one level to generate at least one down-sampled reference image associated with corresponding at least one down-sampled cost volume;
    performing backward up-sampling of the at least one down-sampled cost volume into the at least one level to generate at least one backward up-sampled cost volume;
    performing backward up-sampling of the at least one down-sampled reference image associated with the at least one down-sampled cost volume into the at least one level to generate at least one backward up-sampled reference image associated with corresponding backward up-sampled cost volume;
    computing at least one color weight map associated with at least one of the cost volume and the at least one down-sampled cost volume based on an associated reference image and the at least one backward up-sampled reference image at the at least one level, the associated reference image being one of the reference image and the at least one down-sampled reference image at the at least one level; and
    determining an aggregated cost volume at the at least one level based on a weighted averaging of the at least one backward up-sampled cost volume and an associated cost volume at the at least one level, the associated cost volume being one of the cost volume and the at least one down-sampled cost volume at the at least one level, the weighted averaging being performed based on the at least one color weight map.

2. The method as claimed in claim 1, wherein the backward up-sampling of the at least one down-sampled cost volume is performed based on respective color parameter value of neighboring pixels associated with an individual pixel in the at least one down-sampled cost volume.

3. The method as claimed in claim 1, wherein computing the at least one color weight map associated with the cost volume comprises computing a difference between the reference image and a backward up-sampled reference image associated with the reference image.

4. The method as claimed in claim 1, wherein computing the at least one color weight map associated with the at least one down-sampled cost volume comprises computing a difference between the at least one down-sampled reference image and the at least one backward up-sampled reference image at the at least one level.

5. The method as claimed in claim 4, wherein the aggregated cost volume is determined based on the following expression:

$$\hat{C}^i(x,y,d) = W^i(x,y) \cdot \tilde{C}^i(x,y,d) + (1 - W^i(x,y)) \cdot C^i(x,y,d)$$

where, $\hat{C}^i(x,y,d)$ is the aggregated cost volume,
$W^i(x,y)$ is a color weight map,
$C^i(x,y,d)$ is the at least one down-sampled cost volume, and
$\tilde{C}^i(x,y,d)$ is the at least one backward up-sampled cost volume.

6. The method as claimed in claim 1, further comprising performing a backward up-sampling of the at least one down-sampled cost volume at a subsequent level based on the aggregated cost volume at the at least one level, the subsequent level being subsequent to the at least one level.

7. The method as claimed in claim 1, wherein the cost volume is computed based on a matching of a reference image with a plurality of shifted versions of a target image.

8. The method as claimed in claim 7, wherein the reference image and the target image are rectified images of a scene.

9. The method as claimed in claim 8, wherein the reference image and the target image comprises a stereoscopic pair of images.

10. An apparatus comprising:
    at least one processor; and
    at least one memory comprising computer program code, the at least one memory and the computer program code configured to, with the at least one processor, cause the apparatus to at least perform:
    compute a cost volume associated with a reference image;
    perform down-sampling of the cost volume into at least one level to generate at least one down-sampled cost volume;
    perform down-sampling of the reference image into the at least one level to generate at least one down-sampled reference image associated with corresponding at least one down-sampled cost volume;
    perform backward up-sampling of the at least one down-sampled cost volume into the at least one level to generate at least one backward up-sampled cost volume;
    perform backward up-sampling of the at least one down-sampled reference image associated with the at least one down-sampled cost volume into the at least one level to generate at least one backward up-sampled reference image associated with corresponding backward up-sampled cost volume;
    compute at least one color weight map associated with at least one of the cost volume and the at least one down-sampled cost volume based on an associated reference image and the at least one backward up-sampled reference image at the at least one level, the associated reference image being one of the reference image and the at least one down-sampled reference image at the at least one level; and
    determine an aggregated cost volume at the at least one level based on a weighted averaging of the at least one backward up-sampled cost volume and an associated cost volume at the at least one level, the associated cost volume being one of the cost volume and the at least one down-sampled cost volume at the at least one level, the weighted averaging being performed based on the at least one color weight map.

11. The apparatus as claimed in claim 10, wherein the apparatus is further caused, at least in part to perform the backward up-sampling of the at least one down-sampled cost volume based on respective color parameter value of neighboring pixels associated with an individual pixel in the at least one down-sampled cost volume.

12. The apparatus as claimed in claim 10, wherein for computing the at least one color weight map associated with the cost volume, the apparatus is further caused, at least in part to compute a difference between the reference image and a backward up-sampled reference image associated with the reference image.

13. The apparatus as claimed in claim 10, wherein for computing the at least one color weight map associated with the at least one down-sampled cost volume, the apparatus is further caused, at least in part to compute a difference between the at least one down-sampled reference image and the at least one backward up-sampled reference image at the at least one level.

14. The apparatus as claimed in claim 12, wherein the apparatus is further caused, at least in part to determine the aggregated cost volume based on the following expression:

$$\hat{C}^i(x,y,d) = W^i(x,y) \cdot \tilde{C}^i(x,y,d) + (1 - W^i(x,y)) \cdot C^i(x,y,d)$$

where, $\hat{C}^i(x,y,d)$ is the aggregated cost volume,
$W^i(x,y)$ is a color weight map,
$C^i(x,y,d)$ is the at least one down-sampled cost volume, and
$\tilde{C}^i(x,y,d)$ is the at least one backward up-sampled cost volume.

15. The apparatus as claimed in claim 10, wherein the apparatus is further caused, at least in part to perform a backward up-sampling of the a least tone down-sampled cost volume at a subsequent level based on the aggregated cost volume at the at least one level, the subsequent level being subsequent to the at least one level.

16. The apparatus as claimed in claim 10, wherein the cost volume is computed based on a matching of a reference image with a plurality of shifted versions of a target image.

17. The apparatus as claimed in claim 16, wherein the reference image and the target image are rectified images of a scene.

18. The apparatus as claimed in claim 17, wherein the reference image and the target image comprises a stereoscopic pair of images.

19. The apparatus as claimed in claim 10, wherein the apparatus comprises an electronic device comprising:
   a user interface circuitry and user interface software configured to facilitate a user to control at least one function of the electronic device through use of a display and further configured to respond to user inputs; and
   a display circuitry configured to display at least a portion of a user interface of the electronic device, the display and display circuitry configured to facilitate the user to control at least one function of the electronic device.

20. The apparatus as claimed in claim 19, wherein the electronic device comprises at least one image sensor configured to capture the reference image and the target image.

21. The apparatus as claimed in claim 20, wherein the electronic device comprises a mobile phone.

* * * * *